United States Patent
Estes et al.

(10) Patent No.: US 10,526,905 B2
(45) Date of Patent: Jan. 7, 2020

(54) ASYMMETRIC VANE ASSEMBLY

(71) Applicant: UNITED TECHNOLOGIES CORPORATION, Farmington, CT (US)

(72) Inventors: Matthew B. Estes, South Windsor, CT (US); Bryan P. Dube, Columbia, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 349 days.

(21) Appl. No.: 15/473,222

(22) Filed: Mar. 29, 2017

(65) Prior Publication Data
US 2018/0283189 A1  Oct. 4, 2018

(51) Int. Cl.
*F01D 9/04* (2006.01)

(52) U.S. Cl.
CPC .......... *F01D 9/041* (2013.01); *F05D 2250/73* (2013.01)

(58) Field of Classification Search
USPC .................. 415/191–195, 119; 416/175, 203
See application file for complete search history.

(56) References Cited

U.S. PATENT DOCUMENTS

| | | | | |
|---|---|---|---|---|
| 2,798,661 A | * | 7/1957 | Willenbrock, Jr. | ....... F02C 7/04 415/209.1 |
| 4,253,800 A | * | 3/1981 | Segawa | ..................... F01D 5/10 415/119 |
| 7,097,420 B2 | | 8/2006 | Cormier et al. | |
| 7,743,497 B2 | * | 6/2010 | Gautreau | ................ F01D 9/041 29/402.08 |
| 8,277,166 B2 | * | 10/2012 | Tecza | ..................... F01D 9/041 415/1 |
| 8,534,991 B2 | | 9/2013 | Topol | |
| 8,540,490 B2 | | 9/2013 | Ramakrishnan | |
| 2005/0232763 A1 | * | 10/2005 | Cormier | .................. F01D 9/041 415/208.2 |
| 2012/0099995 A1 | * | 4/2012 | Delvaux | ................... F01D 5/30 416/203 |
| 2013/0149135 A1 | | 6/2013 | Hield | |
| 2014/0286758 A1 | | 9/2014 | Senn | |

(Continued)

FOREIGN PATENT DOCUMENTS

| | | |
|---|---|---|
| EP | 1772596 | 4/2007 |
| EP | 2623793 | 8/2013 |
| GB | 2046849 | 11/1980 |

OTHER PUBLICATIONS

European Patent Office, European Search Report dated Jul. 19, 2018 in Application No. 18153055.1-1006.

*Primary Examiner* — George C Jin
*Assistant Examiner* — Teuta B Holbrook
(74) *Attorney, Agent, or Firm* — Snell & Wilmer, L.L.P.

(57) ABSTRACT

An asymmetric vane assembly includes a high count vane section including a first plurality of vanes oriented in a first position. The asymmetric vane assembly also includes a low count vane section including a second plurality of vanes oriented in a second position, a total number of vanes in the first plurality of vanes being greater than a total number of vanes in the second plurality of vanes, and each vane of the high count vane section and each vane of the low count vane section having substantially similar internal core geometry.

18 Claims, 4 Drawing Sheets

(56) References Cited

U.S. PATENT DOCUMENTS

| | | | | |
|---|---|---|---|---|
| 2016/0146040 A1* | 5/2016 | Simpson | ................. | F01D 25/06 |
| | | | | 60/805 |
| 2016/0160665 A1* | 6/2016 | Simpson | ................. | F01D 5/141 |
| | | | | 415/208.2 |
| 2017/0268537 A1* | 9/2017 | Mielke | .................... | F01D 9/041 |
| 2018/0156235 A1* | 6/2018 | Li | ......................... | F04D 29/542 |

* cited by examiner

ASYMMETRIC VANE ASSEMBLY

GOVERNMENT LICENSE RIGHTS

This disclosure was made with government support under AETD FA8650-09-D-2923-0021 awarded by the United States Air Force. The government has certain rights in the disclosure.

FIELD

The present disclosure relates to a gas turbine engine and, more specifically, to a vane assembly.

BACKGROUND

Gas turbine engines typically include a fan section, a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. One or more sections of the gas turbine engine may include a plurality of vane assemblies having vanes interspersed between rotor assemblies that carry the blades of successive stages of the section. The design of the vanes may be based on the overall design of the gas turbine engine.

SUMMARY

An asymmetric vane assembly for a gas turbine engine is described herein, in accordance with various embodiments. The asymmetric vane assembly may include a high count vane section including a first plurality of vanes oriented in a first position. The asymmetric vane assembly may also include a low count vane section including a second plurality of vanes oriented in a second position, a total number of vanes in the first plurality of vanes being greater than a total number of vanes in the second plurality of vanes, and each vane of the high count vane section and each vane of the low count vane section having substantially similar internal core geometry.

In various embodiments, each vane of the high count vane section and each vane of the low count vane section have substantially similar external airfoil shape. In various embodiments, the high count vane section and the low count vane section provide an operational performance substantially similar to an original vane assembly designed for the gas turbine engine and having uniformly distributed vanes. In various embodiments, the high count vane section occupies a first circumferential half of the asymmetric vane assembly, and the low count vane section occupies a second circumferential half of the asymmetric vane assembly.

In various embodiments, the high count vane section is distributed circumferentially in a plurality of high count subsections, and the low count vane section is distributed circumferentially in a plurality of low count subsections, such that in aggregate, the high count vane section occupies a circumferential half of the asymmetric vane assembly and the low count vane section occupies another circumferential half of the asymmetric vane assembly.

In various embodiments, the first plurality of vanes and the second plurality of vanes are each coupled to a platform and arranged radially around a central axis, the first plurality of vanes being oriented in the first position comprises the first plurality of vanes being angled at a first angle relative to the platform, and the second plurality of vanes being oriented in the second position comprises the second plurality of vanes being angled at a second angle relative to the platform.

In various embodiments, the first plurality of vanes in the high count vane section are evenly spaced apart such that a first distance is between any two adjacent vanes in the first plurality of vanes, and the second plurality of vanes in the low count vane section are evenly spaced apart such that a second distance is between any two adjacent vanes in the second plurality of vanes. In various embodiments, the first distance is less than the second distance.

A gas turbine engine is also provided. The gas turbine engine includes an asymmetric vane assembly located circumferentially around a central axis. The asymmetric vane assembly includes a high count vane section including a first plurality of vanes each connected to a platform and each angled at a first position relative to the platform. The asymmetric vane assembly also includes a low count vane section including a second plurality of vanes each connected to the platform and each angled at a second position relative to the platform, a total number of vanes in the high count vane section being greater than a total number of vanes in the low count vane section, and each vane of the high count vane section and each vane of the low count vane section having substantially similar internal core geometry.

A turbine section of a gas turbine engine is also provided. The turbine section includes an asymmetric vane assembly located circumferentially around a central axis. The asymmetric vane assembly includes a first vane section including a first plurality of vanes each connected to a platform, each angled at a first position relative to the platform, and each separated by a first distance. The asymmetric vane assembly also includes a second vane section including a second plurality of vanes each connected to the platform, each angled at a second position relative to the platform, and each separated by a second distance, the first distance being less than the second distance and each vane of the first vane section and each vane of the second vane section having substantially similar internal core geometry.

In various embodiments, a number of vanes in the first vane section is a whole number of vanes and a number of vanes in the second vane section is a whole number of vanes.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
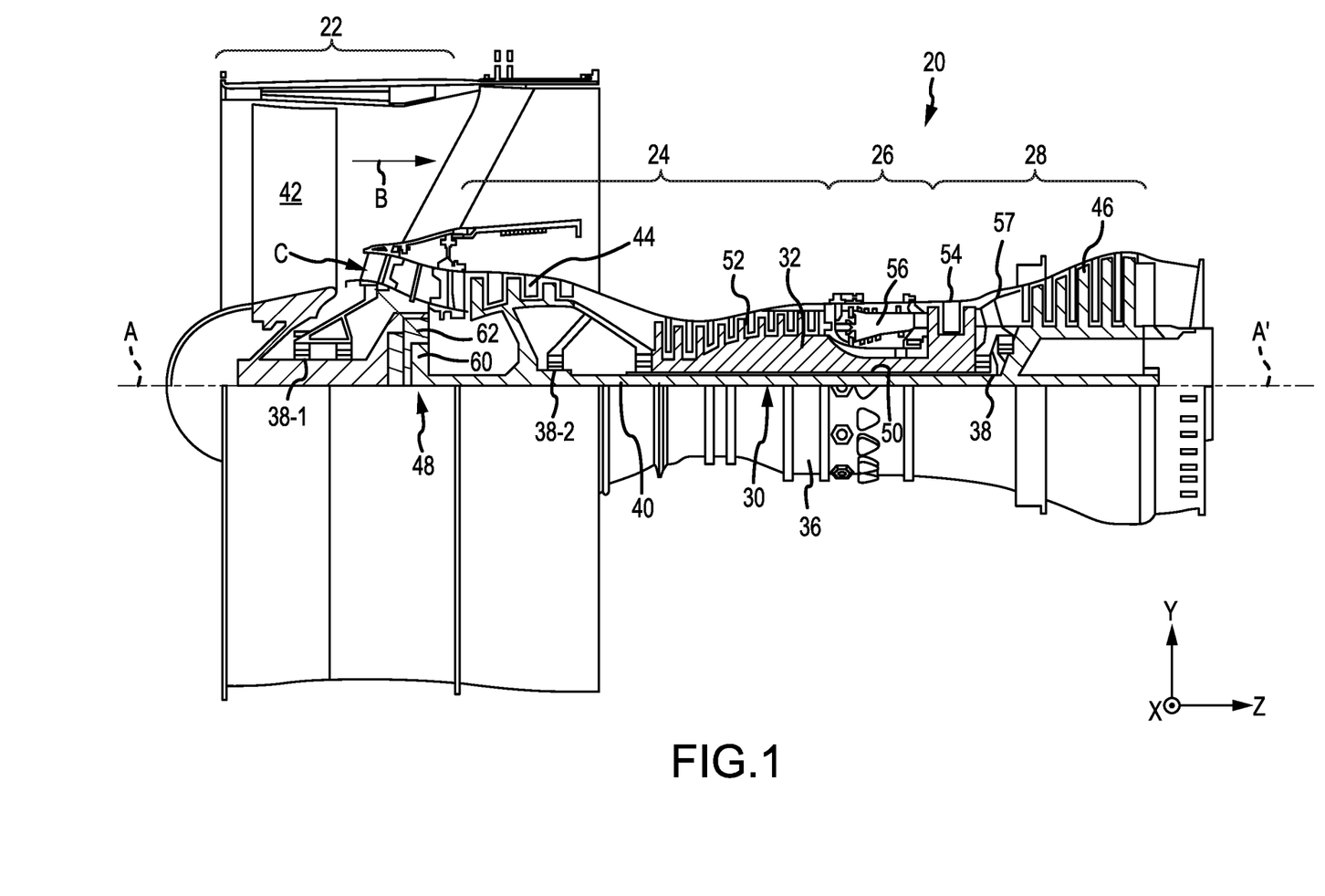
FIG. 1 illustrates a cross-sectional view of an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a path of core airflow C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure or engine case structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine case structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans. A gas turbine engine may comprise an industrial gas turbine (IGT) or a geared aircraft engine, such as a geared turbofan, or non-geared aircraft engine, such as a turbofan, a turboshaft, or may comprise any gas turbine engine as desired.

In various embodiments, fan 42, low pressure compressor 44, high pressure compressor 52, low pressure turbine 46, and high pressure turbine 54 may comprise one or more stages or sets of rotating blades and one or more stages or sets of stationary vanes axially interspersed with the associated blade stages but non-rotating about engine central longitudinal axis A-A'.

Figure 2:
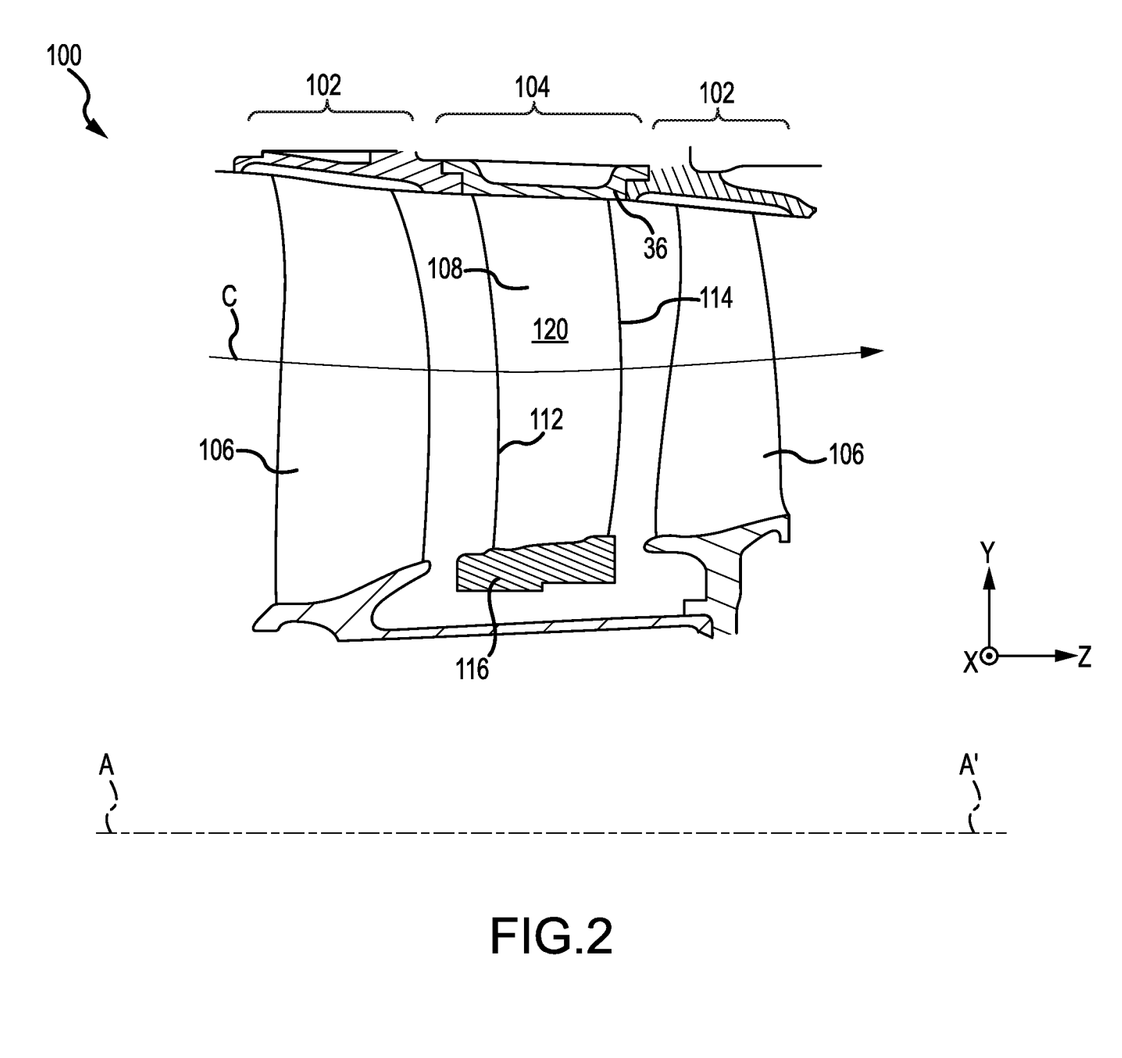
FIG. 2 illustrates a partial cross-sectional view of a turbine section of a gas turbine engine, in accordance with various embodiments.

With reference now to FIG. 2 and still to FIG. 1, a portion of an engine section 100 is shown in accordance with various embodiments. Engine section 100 may be a fan section 22, a compressor section 24 or a turbine section 28. Engine section 100 is illustrated in FIG. 2, for example, as a turbine section. It will be understood that the vane assemblies in this disclosure is not limited to the compressor section, and could extend to other sections of the gas turbine engine 20, including but not limited to the fan section 22.

Referring to FIG. 2, engine section 100 may include alternating rows of rotor assemblies 102 and vane assemblies 104 that carry airfoils that extend into the core flow path C. For example, the rotor assemblies 102 may carry a plurality of rotating blades 106, while each vane assembly may carry a plurality of vanes 108 that extend into the core flow path C. Vanes 108 may be arranged circumferentially about engine central longitudinal axis A. Blades 106 may rotate about engine central longitudinal axis A-A', while vanes 108 may remain stationary about engine central longitudinal axis A-A'. Blades 106 create or extract energy (in the form of pressure) from the core airflow that is communicated through engine section 100 along the core flow path C. Vanes 108 direct the core airflow to blades 106 to either add or extract energy.

Vane 108 may comprise a leading edge 112 and a trailing edge 114. Leading edge 112 and trailing edge 114 may be configured to direct airflow through engine section 100. In various embodiments, vane assembly 104 may increase pressure in engine section 100, and straighten and direct air flow. Vane 108 may comprise, for example, an airfoil body 120.

In various embodiments, vanes 108 may be made of a metal, such as titanium or high-grade aluminum, a metal alloy such as stainless steel, or a composite material such as a fiber composite material. The vanes 108 may be resistant to heat. In various embodiments, the properties of materials use to form vanes 108 are compatible with the temperatures and pressures encountered during operation of engine section 100. In various embodiments, a vane 108 may be resistant to temperatures experienced in the engine section 100.

Vane 108 may be configured to interface with an engine case structure 36 disposed radially outward of vane 108. Engine case structure 36 provides the support for the vane 108 such that loads on vane 108 transfer to the engine case structure 36. Vane 108 may also be configured to be coupled to platform 116. Platform 116 may be an annular structure located around engine central longitudinal axis A-A' and attached to vane 108 and other vanes.

Vane 108 may be part of a vane assembly. The vane assembly may be designed specifically for the gas-turbine engine 20. In various embodiments, after testing the gas-turbine engine 20, the vane assembly may be adjusted to introduce asymmetry. Asymmetry may be used to interrupt forced response on adjacent blade rows and reduce stress. In order to create asymmetry, the vane assembly may be adjusted on an ad-hoc basis by adjusting the orientation of some of the vanes, adjusting spacing between the vanes, and/or removing some of the vanes. For purposes of creating asymmetry, the adjustments may be made on a circumferential half of the vane assembly only. However, this ad-hoc adjustment of the vane assembly to introduce asymmetry may result in a vane assembly that has a different aerodynamic profile. As used herein, "original vane assembly" refers to the symmetrically or uniformly distributed vane assembly designed for the gas-turbine engine 20.

Figure 3A:
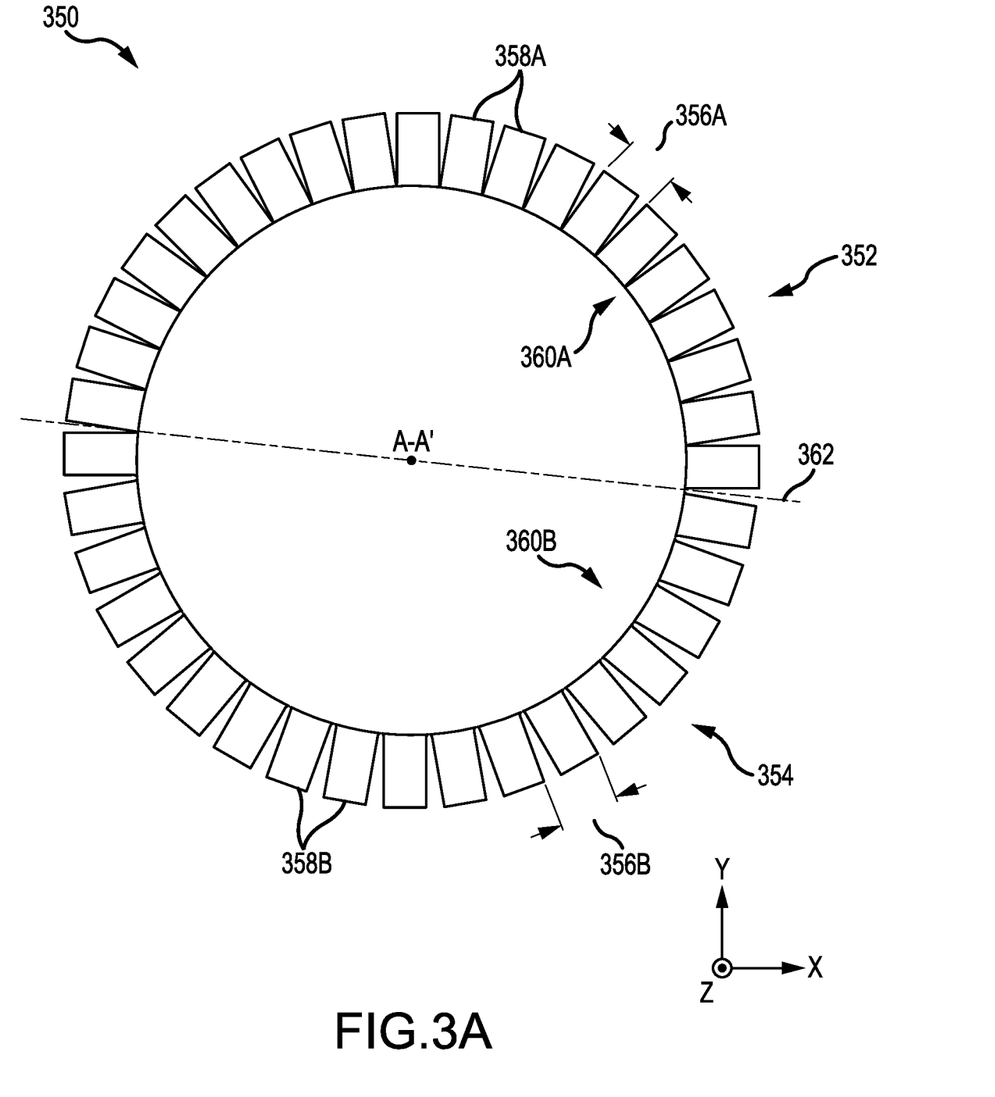
FIG. 3A illustrates an axial view of an asymmetric vane assembly of the gas turbine engine, in accordance with various embodiments.

FIG. 3A illustrates an axial view of an asymmetric vane assembly 350. The asymmetric vane assembly 350 may be a continuous annular shaped structure, or may be made of multiple vane sub-assemblies connected together. The asymmetric vane assembly 350 is divided into a first section 352 and a second section 354. The first section 352 may include a first plurality of vanes 358A equally spaced apart a first distance 356A. The second section 354 includes a second plurality of vanes 358B equally spaced apart a second distance 356B. The asymmetric vane assembly 350 is located circumferentially around engine central longitudinal axis A-A'. Accordingly, the first plurality of vanes 358A and the second plurality of vanes 358B are located radially around engine central longitudinal axis A-A'. The distance 356 between vanes is shown in FIG. 3A as being the distance between the leading edges of two adjacent vanes or the trailing edges of adjacent vanes. In various embodiments, the distance 356 may be referred to as pitch. The pitch may represent the fraction of the circular vane assembly occupied by a section divided by the number of vanes in the section.

The vanes of the asymmetric vane assembly may be located around the engine central longitudinal axis A-A' such that the first plurality of vanes 358A are not downstream from the second plurality of vanes 358B and the second plurality of vanes 358B are not downstream from the first plurality of vanes 358A. That is, a reference point on a particular vane may be coplanar with corresponding respective reference points in the other vanes. For example, the first plurality of vanes 358A and the second plurality of vanes 358B may each be arranged such that a leading edge of a particular vane is located on a common plane as the respective leading edges of the other vanes. In another example, the first plurality of vanes 358A and the second plurality of vanes 358B may each be arranged such that a midpoint of a particular vane is located on a common plane as the respective midpoints of the other vanes.

The first section 352 may be a high count vane section and the second section 354 may be a low count vane section. The high count vane section may include a greater number of vanes than the low count vane section. As shown in FIG. 3A, the first section 352 includes 20 vanes and the second section 354 includes 18 vanes. Since the first section 352 includes more vanes 358A than the second section 354 does, the first distance 356A between the vanes in the first section 352 may be less than the second distance 356B between the vanes in the second section 354. The distance between vanes, as used herein, may refer to the distance between adjacent vanes at corresponding parts of the adjacent vanes. For example, the distance between a first vane and a second vane may be measured between a most radially inward location of the first vane and a most radially inward location of the second vane. Alternatively, the distance between the first vane and the second vane may be measured between a most radially outward location of the first vane and a most radially outward location of the second vane.

The design of asymmetric vane assembly 350 is such that it has an equivalent operation as the original vane assembly designed for the gas-turbine engine 20. That is, the asymmetric vane assembly 350 and the original vane assembly may be interchanged without significant effect on performance of the gas-turbine engine 20. The total number of vanes in the original vane assembly may be different from the total number of vanes (e.g., number of vanes 358A in the first section 352 and number of vanes 358B in the second section 354) in the asymmetric vane assembly 350.

A number of vanes in the first plurality of vanes 358A may be greater than a corresponding portion of the original vane assembly. For example, if the first section 352 occupies half of the asymmetric vane assembly 350 circumferentially and there are 20 vanes 358A in the first section 352, there may be less than 20 vanes in a circumferential half of the original vane assembly. In this example, there may be 38 equally spaced apart vanes in the original vane assembly, resulting in 19 vanes per circumferential half of the original vane assembly.

A number of vanes in the second plurality of vanes 358B may be less than a corresponding portion of the original vane assembly. For example, if the second section 354 occupies a circumferential half of the asymmetric vane assembly 350 and there are 18 vanes 358B in the second section 354, there may be more than 18 vanes in a circumferential half of the original vane assembly. In this example, there may be 38 equally spaced apart vanes in the original vane assembly, resulting in 19 vanes per circumferential half of the original vane assembly.

While the asymmetric vane assembly 350 is shown as having a first section 352 occupying a top circumferential half of the asymmetric vane assembly 350 and a second section 354 occupying a bottom circumferential half of the asymmetric vane assembly 350, the rotational orientation of the first section 352 and the second section 354 of the asymmetric vane assembly 350 is immaterial. For example, instead of the first section 352 being located on a top circumferential half of the asymmetric vane assembly 350, and the second section 354 being located on a bottom circumferential half of the asymmetric vane assembly 350 (as shown in FIG. 3A), the first section 352 may be located on a right hand side and the second section 354 may be located on a left hand side, or vice versa, or any location therebetween.

The first section 352 and the second section 354 may be divided into multiple sections and distributed circumferentially around the asymmetric vane assembly 350 in alternating fashion. For example, a top half 360A of the asymmetric vane assembly 350, as divided by line 362, may have a first high count vane section, a first low count vane section, a second high count vane section, and a second low count vane section, each occupying a quarter of the top half 360A. Likewise, the bottom half 360B of the asymmetric vane assembly 350 may have its own first high count vane section, a first low count vane section, a second high count vane section, and a second low count vane section, each occupying a quarter of the bottom half 360B. In general, the first section 352 may be distributed circumferentially into multiple subsections, and the second section 354 may be distributed circumferentially into multiple subsections, with each subsection having a whole number of vanes. Further, the first section subsections may, in aggregate, occupy a circumferential half of the asymmetric vane assembly 350, and the second section subsections may, in aggregate, occupy another circumferential half of the asymmetric vane assembly 350.

In various embodiments, the number of vanes within each section are a whole number of vanes. For example, if the asymmetric vane assembly 350 has a total of 38 vanes, then the total number of vane sections would be a factor of 38. Stated another way, total vanes divided by vane sections yields a whole number, in accordance with various embodiments. In various embodiments, the asymmetric vane assembly 350 is divided into halves and the number of vanes in each half is a whole number. That is, in these embodiments, a vane section occupies exactly 180 circumferential degrees of the asymmetric vane assembly.

While FIG. 3A illustrates the first section 352 as having more vanes than the second section 354, in various embodiments, the second section 354 may have more vanes than the first section 352 and the second section 354 may occupy more of the circumferential portion of the asymmetric vane assembly 350 than the first section 352. For example, the vanes 358A of the first section 352 may be spaced apart a first distance 356A and the vanes 358B of the second section 354 may be spaced apart a second distance 356B, with the first distance being less than the second distance. Thus, if the first section 352 and the second section 354 occupied equal circumferential portions of the assembly 350, the first section 352 would have more vanes 358A than the second section 354. However, if the second section 354 occupied a greater circumferential portion of the assembly 350 than the first section 352, the second section 354 may contain a greater number of vanes 358B than the first section 352. This arrangement would still achieve the asymmetric design desired, while having a substantially similar operational performance as an original vane assembly designed for the gas-turbine engine 20.

Figure 3B:
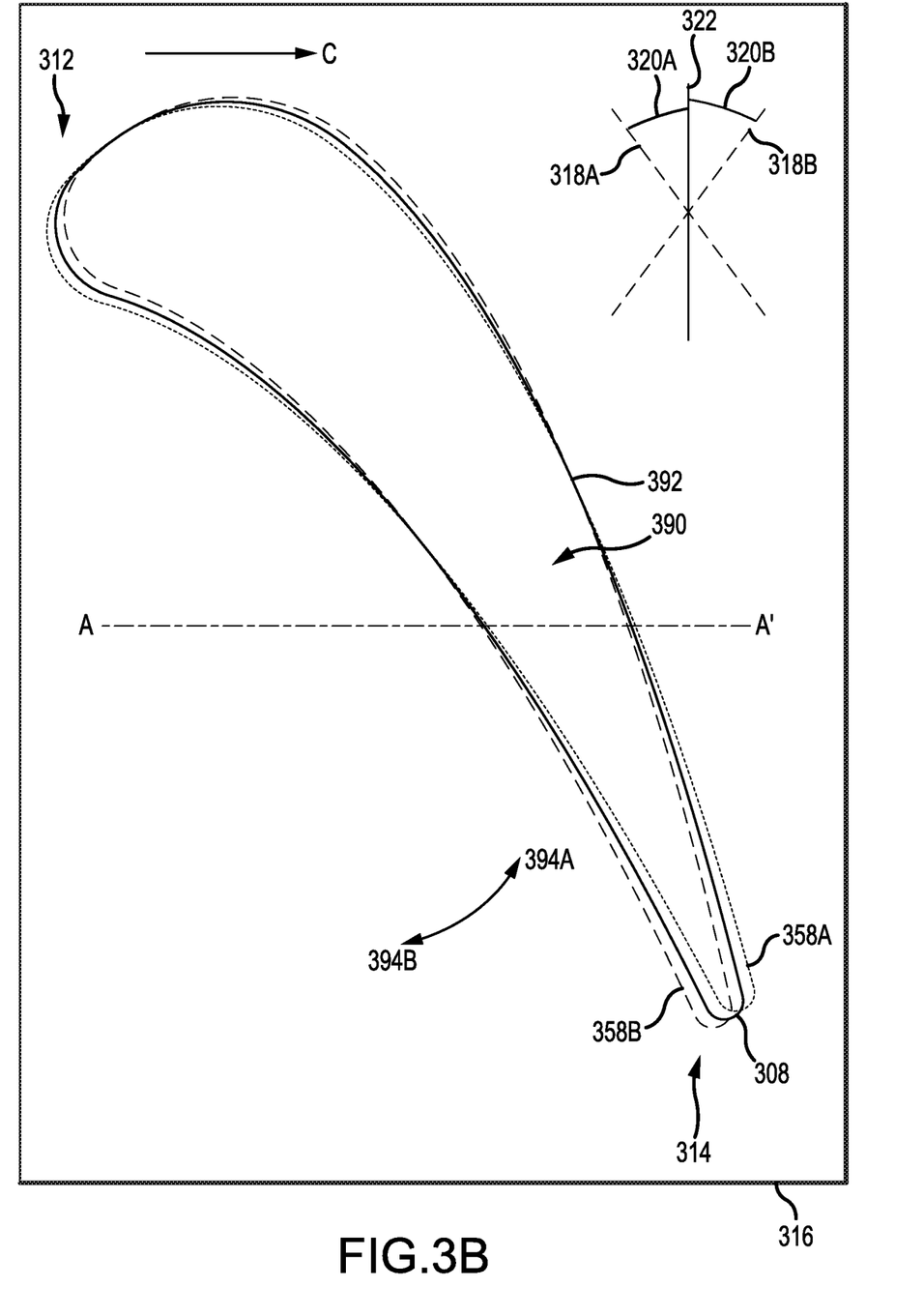
FIG. 3B illustrates a cross-sectional radial view of vanes of an asymmetric vane assembly, in accordance with various embodiments.

In addition to the number of vanes being adjusted, the orientation of the vanes may also be adjusted. FIG. 3B illustrates a radial cross-sectional view of vane 308 of the original vane assembly, vane 358A of the first (high count) section 352, and vane 358B of the second (low count) section 354. The vanes 308, 358A, and 358B each have a leading edge side 312 and a tail edge side 314 and air flowing in core air flow path C travels from the leading edge side 312 to the tail edge side 314. In addition, each of the vanes 308, 358A, and 358B are connected to platform 316, which is similar to platform 116 of FIG. 2.

As shown in FIG. 3B, each of the vanes 308, 358A, and 358B have substantially similar external airfoil shape 392 and substantially similar internal core geometry 390. The internal core geometry 390 includes air flow paths for air to flow within the vanes 308, 358A, and 358B. Having substantially similar vanes allows for the asymmetric vane assembly 350 to more easily have equivalent operation as the original vane assembly. In addition, having substantially similar internal vane structure or core geometry allows for a more efficient manufacturing of the asymmetric vane assembly 350, as the same internal tooling, cores, and baffles used in the original vane assembly may be used throughout the asymmetric vane assembly 350.

The first section 352 has more vanes than the second section 354 does. Accordingly, the orientation of each vane in the first section 352 and the second section 354 may be adjusted to achieve equivalent operation as the original vane assembly.

As shown in FIG. 3B, the vane 358A of the first section 352 of the asymmetric vane assembly 350 may be a rotation of vane 308 from the original vane assembly, relative to the platform 316. Vane 308 may be oriented in an original, baseline position. The vane 358A may be rotated in a first direction 394A (e.g., counterclockwise, as shown in FIG. 3B). The vane 358B of the second section 354 of the asymmetric vane assembly 350 may be a rotation of vane 308 from the original vane assembly, relative to the platform 316. The vane 358B may be rotated in a second direction 394B (e.g., clockwise, as shown in FIG. 3B). The second direction 394B may be opposite the first direction 394A.

As illustrated in FIG. 3B, axis 322 represents the orientation of vane 308 of original vane assembly, axis 318A represents the orientation of vane 358A from the asymmetric vane assembly 350, and axis 318B represents the orientation of vane 358B of the asymmetric vane assembly 350. The vane 358A from the first section 352 of the asymmetric vane assembly 350 may be rotated a first rotation angle 320A and the vane 358B of the second section 354 of the asymmetric vane assembly 350 may be rotated a second rotation angle 320B. The first rotation angle 320A and the second rotation angle 320B may be equal amounts, but in opposite directions. The first rotation angle 320A and the second rotation angle 320B may be different amounts, and in opposite directions.

The first rotation angle 320A and subsequent orientation of the vane 358A may be referred to as an open position and the second rotation angle 320B and subsequent orientation of the vane 358B may be referred to as a closed position. There may be more vanes 358A in the first section 352 as compared to a corresponding circumferential section of the original symmetric vane assembly. Accordingly, the vanes 358A are in the open position to accommodate for the increased number of vanes. There may be fewer vanes 358B in the second section 354 as compared to a corresponding circumferential section of the original symmetric vane assembly. Accordingly, the vanes 358B are in the closed position to accommodate for the decreased number of vanes. The aggregate airflow passing through the asymmetric vane assembly 350 is substantially the same as the aggregate airflow passing through the original symmetric vane assembly. This substantial equivalence in aggregate airflow may be referred to as operational performance. Operational performance may also include efficiency or any performance metrics or measurements associated with a vane assembly working in conjunction with other parts of the gas-turbine engine 20.

The first rotation angle 320A, the second rotation angle 320B, and the number of vanes in the first section 352 and the number of vanes in the second section 354 may all be determined based on the original vane assembly and the gas-turbine engine 20. Therefore, the first rotation angle 320A, the second rotation angle 320B, and the number of vanes in the first section 352 and the number of vanes in the second section 354 may vary from gas-turbine engine to gas-turbine engine, and even from section to section within the same gas-turbine engine.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An asymmetric vane assembly for use in a gas turbine engine, the asymmetric vane assembly comprising:
    a high count vane section including a first plurality of vanes oriented in a first position; and a low count vane section including a second plurality of vanes oriented in a second position, a total number of vanes in the first plurality of vanes being greater than a total number of vanes in the second plurality of vanes, each vane of the high count vane section and each vane of the low count vane section having substantially similar internal core geometry,
    wherein the first plurality of vanes and the second plurality of vanes are each coupled to a platform and arranged radially around a central axis,
    wherein the first plurality of vanes being oriented in the first position comprises the first plurality of vanes being angled at a first angle relative to the platform,
    wherein the second plurality of vanes being oriented in the second position comprises the second plurality of vanes being angled at a second angle relative to the platform, and wherein the first angle is different than the second angle; and,
    wherein the high count vane section occupies a first continuous circumferential half of the asymmetric vane assembly, and the low count vane section occupies a second continuous circumferential half of the asymmetric vane assembly.

2. The asymmetric vane assembly of claim 1, wherein each vane of the high count vane section and each vane of the low count vane section have substantially similar external airfoil shape.

3. The asymmetric vane assembly of claim 1, wherein the high count vane section and the low count vane section provide an operational performance substantially similar to an original vane assembly designed for the gas turbine engine and having uniformly distributed vanes, such that an aggregate amount of air passing through the high count vane section and the low count vane section is substantially similar to an aggregate amount of air passing through the original vane assembly.

4. The asymmetric vane assembly of claim 1, wherein the high count vane section is distributed circumferentially in a plurality of high count subsections, and wherein the low count vane section is distributed circumferentially in a plurality of low count subsections, such that in aggregate, the high count vane section occupies a circumferential half of the asymmetric vane assembly and the low count vane section occupies another circumferential half of the asymmetric vane assembly.

5. The asymmetric vane assembly of claim 1, wherein the first plurality of vanes in the high count vane section are evenly spaced apart such that a first distance is between any two adjacent vanes in the first plurality of vanes, and
   wherein the second plurality of vanes in the low count vane section are evenly spaced apart such that a second distance is between any two adjacent vanes in the second plurality of vanes.

6. The asymmetric vane assembly of claim 5, wherein the first distance is less than the second distance.

7. A gas turbine engine, comprising:
   an asymmetric vane assembly located circumferentially around a central axis, the asymmetric vane assembly including:
   a high count vane section including a first plurality of vanes each connected to a platform and each angled at a first position relative to the platform; and
   a low count vane section including a second plurality of vanes each connected to the platform and each angled at a second position relative to the platform, a total number of vanes in the high count vane section being greater than a total number of vanes in the low count vane section, and each vane of the high count vane section and each vane of the low count vane section having substantially similar internal core geometry,
   wherein the first plurality of vanes and the second plurality of vanes are each coupled to the platform and arranged radially around the central axis,
   wherein the first plurality of vanes being oriented in the first position comprises the first plurality of vanes being angled at a first angle relative to the platform,
   wherein the second plurality of vanes being oriented in the second position comprises the second plurality of vanes being angled at a second angle relative to the platform, and wherein the first angle is different than the second angle; and,
   wherein the high count vane section occupies a first continuous circumferential half of the asymmetric vane assembly, and the low count vane section occupies a second continuous circumferential half of the asymmetric vane assembly.

8. The gas turbine engine of claim 7, wherein the high count vane section is distributed circumferentially in a plurality of high count subsections, and wherein the low count vane section is distributed circumferentially in a plurality of low count subsections, such that in aggregate, the high count vane section occupies a circumferential half of the asymmetric vane assembly and the low count vane section occupies another circumferential half of the asymmetric vane assembly.

9. The gas turbine engine of claim 7, wherein each vane of the high count vane section and each vane of the low count vane section have substantially similar external airfoil shape.

10. The gas turbine engine of claim 7, wherein the asymmetric vane assembly has a substantially similar operational performance as an original vane assembly designed for the gas turbine engine having uniformly distributed vanes, such that an aggregate amount of air passing through the asymmetric vane assembly is substantially similar to an aggregate amount of air passing through the original vane assembly.

11. The gas turbine engine of claim 7, wherein the high count vane section occupies a first continuous circumferential half of the asymmetric vane assembly, and the low count vane section occupies a second continuous circumferential half of the asymmetric vane assembly.

12. The gas turbine engine of claim 7, wherein the first plurality of vanes in the high count vane section are evenly spaced apart such that a first distance is between any two adjacent vanes in the first plurality of vanes, and
   wherein the second plurality of vanes in the low count vane section are evenly spaced apart such that a second distance is between any two adjacent vanes in the second plurality of vanes.

13. The gas turbine engine of claim 12, wherein the first distance is less than the second distance.

14. A turbine section of a gas-turbine engine, comprising:
   an asymmetric vane assembly located circumferentially around a central axis, the asymmetric vane assembly including:
   a first vane section including a first plurality of vanes each connected to a platform, each angled at a first position relative to the platform, and each separated by a first distance; and
   a second vane section including a second plurality of vanes each connected to the platform, each angled at a second position relative to the platform, and each separated by a second distance, the first distance being less than the second distance and each vane of the first vane section and each vane of the second vane section having a substantially similar internal core geometry,
   wherein the first plurality of vanes and the second plurality of vanes are each coupled to the platform and arranged radially around the central axis,
   wherein the first plurality of vanes being oriented in the first position comprises the first plurality of vanes being angled at a first angle relative to the platform,
   wherein the second plurality of vanes being oriented in the second position comprises the second plurality of vanes being angled at a second angle relative to the platform, and
   wherein the first angle is different than the second angle; and
   wherein the high count vane section occupies a first continuous circumferential half of the asymmetric vane assembly, and the low count vane section occupies a second continuous circumferential half of the asymmetric vane assembly.

15. The turbine section of claim 14, wherein each vane of the first vane section and each vane of the second vane section have a substantially similar external airfoil shape.

16. The turbine section of claim 14, wherein the asymmetric vane assembly has a substantially similar operational performance as an original vane assembly designed for the gas-turbine engine having uniformly distributed vanes, such that an aggregate amount of air passing through the asymmetric vane assembly is substantially similar to an aggregate amount of air passing through the original vane assembly.

17. The turbine section of claim 14, wherein a number of vanes in the first vane section is a whole number of vanes and a number of vanes in the second vane section is a whole number of vanes.

18. The turbine section of claim 14, wherein a number of vanes in the first vane section is greater than a number of vanes in the second vane section.

\* \* \* \* \*